United States Patent Office 3,008,971
Patented Nov. 14, 1961

3,008,971
TETRAHYDROPYRANYL DERIVATIVES
John Mulvin Parker, Montreal, Quebec, and Burton Kendall Wasson, Valois, Quebec, Canada, assignors to Charles E. Frosst & Co., a corporation of Quebec
No Drawing. Filed Nov. 21, 1960, Ser. No. 70,427
3 Claims. (Cl. 260—345.8)

The present invention relates to novel tetrahydropyranyl derivatives and to a method of their preparation.

The novel tetrahydropyranyl derivatives of the present invention have the following formula:

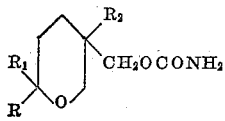

Wherein R stands for hydrogen or a lower alkyl radical having from 1 to 4 carbon atoms, $R_1$ stands for hydrogen or methyl, and $R_2$ is a lower alkyl radical having from 1 to 4 carbon atoms.

The products of the present invention may be prepared by reacting a 5-hydroxymethyltetrahydropyran of the formula

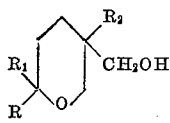

with phosgene to form the corresponding chlorocarbonate and treating said chlorocarbonate with either anhydrous ammonia or ammonium hydroxide.

When it is desired to prepare a compound wherein R and $R_1$ both stand for hydrogen, the 5-hydroxymethyltetrahydropyran is obtained by reducing a diethyl $R_2$(carbethoxyethyl)malonate, for example, diethyl ethyl(carbethoxyethyl)malonate with lithium aluminum hydride and dehydrating the 2-$R_2$-2-($\gamma$-hydroxypropyl)-1,3-propanediol, for example, 2-ethyl-2-($\gamma$-hydroxypropyl)-1,3-propanediol with potassium acid sulphate to give the desired starting 3-$R_2$-3-hydroxymethyltetrahydropyran, for example, 3-ethyl-3-hydroxymethyltetrahydropyran.

On the other hand, when the $R_1$ stands for methyl and R stands for a lower alkyl radical, the starting 2,2-R,$R_1$-5-$R_2$-5-hydroxymethyltetrahydropyran, for example, 2,2-dimethyl-5-ethyl-5-hydroxymethyltetrahydropyran is obtained by reducing a diethyl $R_2$(3,3-R,$R_1$-2-propenylmalonate, for example, diethyl ethyl(3,3-dimethyl-2-propenyl)-malonate with lithium aluminum hydride and cyclizing the 2-$R_2$-2(3,3-R,$R_1$-2-propenyl)-1,3 propanediol, for example, 2-ethyl-2(3,3-dimethyl-2-propenyl)-1,3-propanediol in the presence of a mineral acid to form the desired starting 2,2-R,$R_1$-5-$R_2$-5-hydroxymethyltetrahydropyran, for example, 2,2-dimethyl-5-ethyl-5-hydroxymethyltetrahydropyran. The products of the present invention have been found to possess sedative and muscle relaxing properties at a dose substantially lower than the lethal dose. Effective doses are listed in Table I.

TABLE I

Effective doses in mg./kg.

| R | $R_1$ | $R_2$ | $LD_{50}$ mice | $PD_{50}$ mice |
|---|---|---|---|---|
| H | H | Ethyl | 640 | 450 |
| $CH_3$ | $CH_3$ | do | 1,020 | 230 |

It was further found that the 3-ethyltetrahydropyranyl-3-methyl carbamate, when administered at a dose of 200 mg./kg., depressed and inactivated 100% of the animals. Accordingly, this compound was found to produce sedation at a dose which is approximately one third of the $LD_{50}$.

The following examples are given to illustrate the preparation of the products of the present invention and are not to be construed as limiting the invention.

EXAMPLE I.—2,2-DIMETHYL-5-ETHYL-5-HYDROXYMETHYLTETRAHYDROPYRAN (a) A solution of 84.4 grams of diethyl ethyl(3-methyl-2-butenyl)-malonate in 280 ml. anhydrous ethyl ether was added dropwise during 70 min. at 5°–10° C. to 18.7 grams of lithium aluminum hydride in 490 ml. anhydrous ethyl ether. The mixture was left at room temperature overnight and the complex decomposed by the addition of methanol followed by water. The ethereal layer was separated. The solids were repeatedly extracted with ethyl ether. The combined ethereal extracts were evaporated to give 49.4 grams of crude 2-ethyl-2(3-methyl-2-butenyl)-1,3-propanediol.

(b) The crude 2-ethyl-2(3-methyl-2-butenyl)-1,3-propanediol (15 grams) dissolved in 55 ml. tetrahydrofuran was refluxed three hours with 14.2 ml. 6 N hydrochloric acid. The tetrahydrofuran was removed by distillation. The residue was neutralized by the addition of dilute sodium hydroxide and then extracted with ethyl ether. The ethereal extract was washed with water and the solvent remained to give 15.4 grams 2,2-dimethyl-5-ethyl-5-hydroxymethyltetrahydropyran.

2,2-DIMETHYL-5-ETHYLTETRAHYDROPYRANYL-5-METHYL CARBAMATE

A solution of 14.4 grams of 2,2-dimethyl-5-ethyl-5-hydroxymethyltetrahydropyran in 60 ml. tetrahydrofuran was added dropwise accompanied by stirring during a period of 25 minutes to 12.4 grams of phosgene dissolved in 50 ml. of tetrahydrofuran with the temperature being maintained at —9° to 0° C. The mixture was stirred 15 minutes at this temperature and then a further 30 minutes at room temperature. The above chlorocarbonate solution was added during 55 minutes to 34.1 ml. of concentrated ammonium hydroxide maintained at —2° to 7° C. The mixture was stirred ten minutes at this temperature and then one hour at room temperature. The tetrahydrofuran and excess ammonia were distilled off. The remaining mixture was extracted with ethyl ether. The combined ethereal extracts were evaporated to yield 18.1 grams of crude product. This material was recrystallized from ethyl ether-petroleum ether to give 12.25 grams of 2,2-dimethyl-5-ethyltetrahydropyranyl-5-methyl carbamate. An analytical sample of this compound had a melting point of 73.5–74.5° C.

Analysis.—Calculated for $C_{11}H_{21}NO_3$; C: 61.36%, H: 9.81%, N: 6.51%. Found: C: 61.41%, H: 9.36%, N: 6.68%.

EXAMPLE II.—2-ETHYL-2($\gamma$-HYDROXYPROPYL)-1,3-PROPANEDIOL

A solution of 175.4 grams of diethyl ethyl(carbethoxyethyl)malonate in 650 ml. anhydrous ethyl ether was added during 3.5 hours to 51.8 grams of lithium aluminum hydride in 1200 mls. of ethyl ether maintained at 10°–15° C. The mixture was allowed to stand overnight at room temperature and the complexes were decomposed. Carbon dioxide was passed into the mixture and the solids were collected. The solids were repeatedly washed with ethyl acetate. The combined organic extracts were evaporated to afford 79 grams (80.5%) of crude 2-ethyl-2-($\gamma$-hydroxypropyl)-1,3-propanediol.

3-ETHYL-3-HYDROXYMETHYLTETRAHYDROPYRAN

A mixture of 11 grams of 2-ethyl-2($\gamma$-hydroxypropyl)-1,3-propanediol, 4 grams of potassium acid sulfate, and 0.2 gram of hydroquinone was distilled at 102°–105° C./6 mm. to give 7.9 grams (80.8%) of 3-ethyl-3-hydroxymethyltetrahydropyran.

3-ETHYLTETRAHYDROPYRANYL-3-METHYL CARBAMATE

A solution of 37.22 grams of 3-ethyl-3-hydroxymethyl-tetrahydropyran in 150 ml. tetrahydrofuran was added during 45 minutes accompanied by stirring to 38.4 grams of phosgene dissolved in 153 ml. tetrahydrofuran maintained at 0° to 5° C. The solution was stirred one hour at room temperature. The chlorocarbamate solution was added dropwise during 2.5 hours to 105 ml. of concentrated ammonium hydroxide and 12 grams of sodium bisulfite maintained at −5° to 8° C. Water was added and the tetrahydrofuran was removed by distillation. The aqueous residue was extracted with ethyl ether and evaporation of the solvent gave 29.5 grams of 3-ethyltetrahydropyranyl-3-methyl carbamate. Recrystallization of this product from methanol afforded an analytical sample having a melting point of 125.5°–126.5° C.

*Analysis.*—Calculated for $C_9H_{17}NO_3$; C: 57.74%; H: 9.16%; N: 7.48%. Found: C: 57.57%; H: 8.87%; N: 7.71%.

We claim:
1. A compound of the formula:

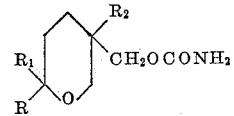

wherein R is a radical selected from the group consisting of hydrogen and a lower alkyl radical having from 1 to 4 carbon atoms, $R_1$ is a radical selected from the group consisting of hydrogen and methyl, and $R_2$ is a lower alkyl radical of from 1 to 4 carbon atoms.
2. 3-ethyltetrahydropyranyl-3-methyl carbamate.
3. 2,2-dimethyl-5-ethyltetrahydropyranyl-5-methyl carbamate.

No references cited.